(No Model.)

J. H. CLAPP.
AUTOMATIC BRAKE FOR POWER PRESSES.

No. 365,047. Patented June 21, 1887.

Witnesses:
J. B. Halpenny
David Stevens

Inventor:
James H. Clapp,
By Gridley & Fletcher
his Att'ys.

UNITED STATES PATENT OFFICE.

JAMES H. CLAPP, OF CHICAGO, ILLINOIS, ASSIGNOR TO JAMES LEWIS BOARD, OF SAME PLACE.

AUTOMATIC BRAKE FOR POWER-PRESSES.

SPECIFICATION forming part of Letters Patent No. 365,047, dated June 21, 1887.

Application filed February 11, 1887. Serial No. 227,261. (No model.)

*To all whom it may concern:*

Be it known that I, JAMES H. CLAPP, of Chicago, in the county of Cook and State of Illinois, have invented certain new and useful Improvements in Automatic Brakes for Power-Presses, of which the following is a description, reference being had to the accompanying drawings, forming a part of this specification, in which—

Figure 1:
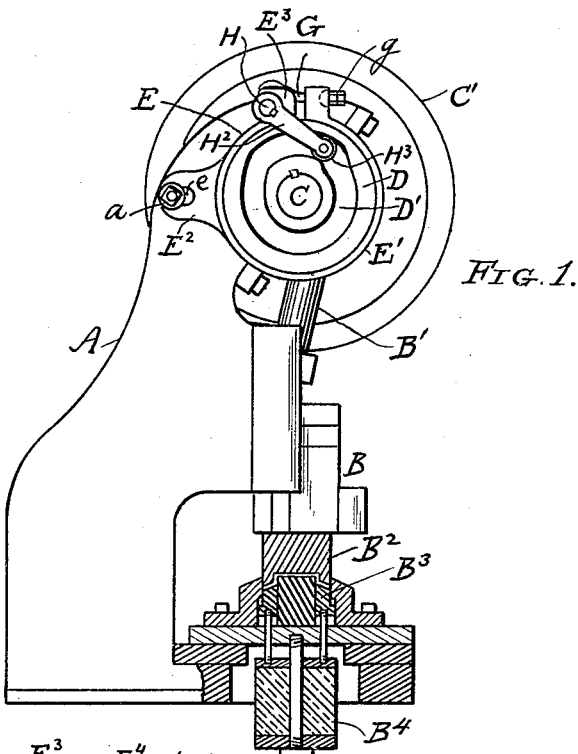
Figure 2:
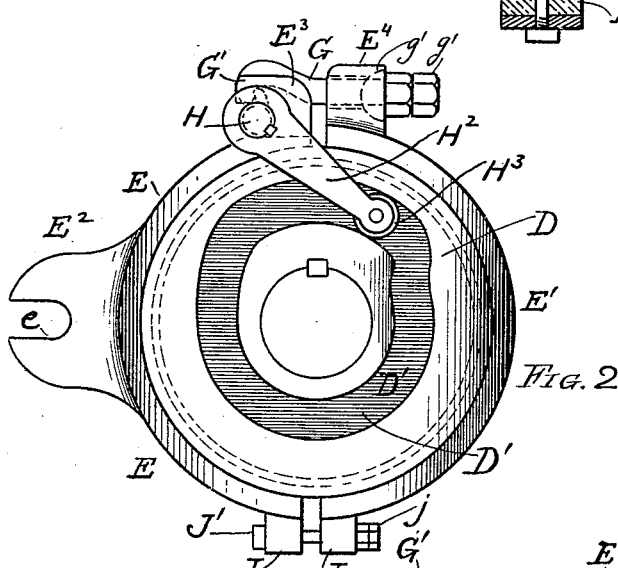
Figure 3:
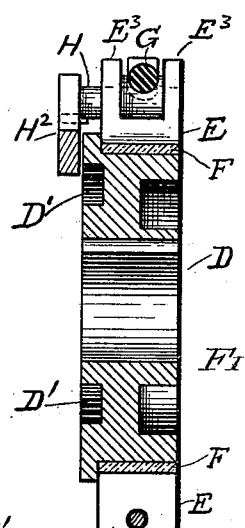
Figure 4:
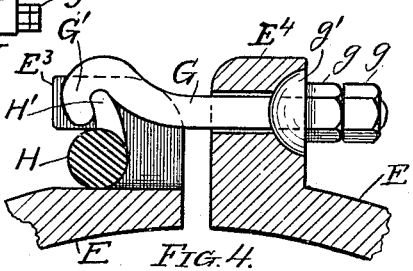

Figure 1 is a side view of a power-press, the bed and dies of which are in section, showing my improved brake applied to the shaft thereof. Fig. 2 is an enlarged detail view of said brake mechanism. Fig. 3 is a transverse sectional view of the same; and Fig. 4 is a detail view of one end of the lever-arm and hook-bolt for operating the brake, the friction band or brake being shown in longitudinal section.

Like letters of reference indicate like parts in the different figures.

In power-presses, such as are employed for stamping metal, the lower die is usually placed upon a powerful spring of steel or rubber, so as to produce a backward pressure for the purpose of preventing the formation of wrinkles in the stamped metal. In addition to the great power necessarily employed to form the material, the back-pressure of the spring is very great, and upon the reverse stroke the cross-head is driven upwardly with such force and so suddenly as to frequently break or derange the usual clutch mechanism or other parts of the machinery. To overcome this objectionable feature a friction-brake is usually applied to the shaft which actuates the cross-head, and as its action is continuous its resistance is added to that above referred to, and as a result the power required to drive the machine is very largely increased. Added to this objection the continuous action of the brake causes the journal to heat, and it is frequently necessary to stop the machine on this account.

The purpose of my invention is to overcome these objections and to construct a brake which shall act automatically and only at the time required to prevent a sudden acceleration in the motion of the shaft, which would otherwise be produced by the action of the spring during the back-stroke, as stated, all of which I accomplish substantially in the manner hereinafter more particularly described and claimed.

A in the drawings represents the frame of a power-press provided with the usual cross-head, B, connected to and actuated by means of a crank-rod, B', attached to a crank upon the shaft C.

$B^2$ $B^3$ are the upper and lower dies, and $B^4$ is the usual rubber cushion or spring. Mounted upon the opposite end of the shaft by means of the common and well-known clutch mechanism is a balance-wheel, C', which is thrown into gear from time to time as its momentum is required to aid in the act of stamping the material. It is this necessary looseness upon the shaft that permits the sudden reverse movement which it is the province of the brake to prevent.

Keyed rigidly to the shaft C is a disk, D, which rotates with the shaft. Around the circumference of said disk I place a loose ring or band-brake, preferably divided into halves E E', the former of which is provided with a lug or extension, $E^2$, having a slot, $e$, through which is inserted a bolt, $a$, by which it is secured to the frame of the machine to prevent the brake from revolving with the disk D. A leather friction-surface, F, Fig. 3, is interposed between the disk and band.

Lugs $E^3$ $E^3$ $E^4$ are formed upon the meeting ends of the ring, through the latter of which is inserted a hook-bolt, G, secured by nuts $g$ $g$, between which and the lug is interposed a half-ball washer, $g'$. The lugs $E^3$ are hook-shaped and form a bearing for a loose cross-pin, H, provided with finger H', Fig. 4, which engages with the hook G' upon the opposite end of the hook G. An arm, $H^2$, is keyed rigidly to the pin H, and is provided upon its free end with a friction-roller, $H^3$, adjusted in a grooved cam, D'. The pin H, finger H', and arm $H^2$ constitute a lever fulcrumed upon one end of the friction-brake. The cam D' is so shaped as to throw the end of the arm $H^2$ away from the center of the shaft at the time when the die has finished its work and is commencing its reverse movement. This serves to tighten the brake by drawing the ends of the ring E E' closer together, which action is continued until the spring $B^4$ beneath the lower die has ceased its upward movement, at which time the roller H³ is thrown toward the center of the shaft, which causes the friction upon the disk D to be wholly released during the remainder of the stroke.

The clamp or brake may consist of a single ring broken only at the point where the hookbolt is applied, as in Fig. 1, or it may be made, as shown in Fig. 2, in which case lugs J J are formed thereon and connected by means of a bolt, J', having nuts upon its end. I prefer this construction to that of the ring formed in one piece. As the friction-surface becomes worn the brake may be adjusted by means of the nuts $g\ j'$.

As there is no friction upon the disk during the larger portion of the stroke, the heating of the shaft is avoided, and all the power applied to the machine is available for the work which it is designed to accomplish.

Having thus described my invention, I claim—

1. An automatic brake for power-presses, consisting of a rigid disk upon the shaft, a band-brake surrounding the same, with means to prevent its revolution therewith, and a lever fulcrumed upon the end of said brake, said lever having a friction-roller upon one end in engagement with a cam formed upon said disk, while the other end is in engagement with a link-connection attached to the opposite end of said brake, all combined substantially as and for the purposes set forth.

2. The combination, with a power-press, of a disk rigidly attached to the shaft, a friction-brake applied to its periphery, a lever fulcrumed upon one end of said brake and having its short arm engaging with a link attached to the other end, and a cam and friction-roller for actuating the long arm of the lever, whereby said brake is alternately applied to and released from the disk as the shaft is revolved, substantially as and for the purposes set forth.

3. The combination, with the shaft of a power-press, of the cam-grooved disk D, brake E E', with means for preventing its revolution, lever H H', having a friction-roller engaging with said cam-groove, and the hook-bolt G, substantially as and for the purposes specified.

JAMES H. CLAPP.

Witnesses:
D. H. FLETCHER,
R. D. WARDWELL.